United States Patent [19]
Takagi

[11] Patent Number: 5,543,879
[45] Date of Patent: Aug. 6, 1996

[54] DRIVING APPARATUS

[75] Inventor: Tadao Takagi, Yokohama, Japan

[73] Assignee: Nikon Corporation, Tokyo, Japan

[21] Appl. No.: 322,539

[22] Filed: Oct. 13, 1994

[30] Foreign Application Priority Data

Oct. 15, 1993 [JP] Japan .................................. 5-281843

[51] Int. Cl.⁶ .............................. G03B 5/00; G03B 17/00
[52] U.S. Cl. ...................... 354/202; 354/195.1; 310/323
[58] Field of Search .............................. 354/202, 195.1; 310/317, 323

[56] References Cited

U.S. PATENT DOCUMENTS

| | | | |
|---|---|---|---|
| 5,130,729 | 7/1992 | Sato et al. ................................. | 354/202 |
| 5,210,563 | 5/1993 | Hamada et al. ......................... | 354/202 |
| 5,231,325 | 7/1993 | Tamai et al. ............................. | 310/323 |
| 5,309,190 | 5/1994 | Shinohara et al. ..................... | 354/195.1 |
| 5,335,032 | 8/1994 | Onuki et al. ............................ | 354/195.1 |
| 5,420,660 | 5/1995 | Akimoto et al. ........................ | 354/400 |
| 5,444,512 | 8/1995 | Morizumi .............................. | 354/195.12 |

FOREIGN PATENT DOCUMENTS

| | | |
|---|---|---|
| 59-107309 | 6/1984 | Japan . |
| 2-154214 | 6/1990 | Japan . |
| 5-2016 | 1/1993 | Japan . |

*Primary Examiner*—Michael L. Gellner
*Assistant Examiner*—Michael Dalakis

[57] ABSTRACT

When an ultrasonic motor and a vibration detecting element are provided, in order to make it possible to accurately effect the detection by the vibration detecting element, the resonance frequency band and/or the drive control range of the ultrasonic motor and the resonance frequency band or the half value width band of the resonance of the vibration detecting element are set so as to be discrete bands.

15 Claims, 5 Drawing Sheets

DRIVING APPARATUS

BACKGROUND OF THE INVENTION

1. Field of the Invention

This invention relates to a driving apparatus provided with an ultrasonic motor and a vibration detecting element.

2. Related Background Art

As an apparatus provided with an ultrasonic motor, there is known, for example, a lens driving apparatus using a vibration wave motor (an ultrasonic motor) comprising a stator, a mover frictionally contacting with the stator, and electro-mechanical energy converting means included in one of the stator and the mover and generating a travelling vibration wave (Japanese Patent Application Laid-Open No. 59-107309, etc.).

Also, as an apparatus provided with a vibration detecting element, there is known, for example, a camera having a correcting optical system for preventing image vibration, a driving device for driving the correcting optical system, and object speed information generating means (a vibration detecting element) generating the moving speed information of an object as an output (Japanese Patent Application Laid-Open No. 2-154214, etc.).

For example, there has been a problem that when an ultrasonic motor and a vibration detecting element as described above are incorporated in an image vibration preventing camera or the like, the vibration detecting element resonates due to the vibration of the ultrasonic motor and accurate vibration detection becomes impossible.

SUMMARY OF THE INVENTION

It is the object of the present invention to provide an apparatus provided with an ultrasonic motor and a vibration detecting element which can accurately effect the detection by the vibration detecting element when the apparatus is provided with an ultrasonic motor and a vibration detecting element.

To achieve the above object, the apparatus provided with an ultrasonic motor and a vibration detecting element according to the present invention is characterized in that the resonance frequency band of said vibration detecting element and the resonance frequency band of said ultrasonic motor are set to discrete bands.

The apparatus according to the present invention is an apparatus provided with an ultrasonic motor and a vibration detecting element, characterized in that the half value width band of the resonance of said vibration detecting element and the frequency control range of said ultrasonic motor are set to discrete bands.

The apparatus according to the present invention is an apparatus provided with an ultrasonic motor and a vibration detecting element, characterized in that the resonance frequency band of said vibration detecting element and the frequency control range of said ultrasonic motor are set to discrete bands.

The apparatus according to the present invention is an apparatus provided with an ultrasonic motor and a vibration detecting element, characterized in that the half value width band of the resonance of said vibration detecting element and the resonance frequency band of said ultrasonic motor are set to discrete bands.

The apparatus according to the present invention is an apparatus provided with an ultrasonic motor and a vibration detecting element, characterized in that the resonance frequency band of said ultrasonic motor is set to other band than the resonance frequency band of said vibration detecting element.

The apparatus according to the present invention is an apparatus provided with an ultrasonic motor and a vibration detecting element, characterized in that the frequency control range of said ultrasonic motor is set to other band than the half value width band of the resonance of said vibration detecting element.

The apparatus according to the present invention is an apparatus provided with an ultrasonic motor and a vibration detecting element, characterized in that the frequency control range of said ultrasonic motor is set to other band than the resonance frequency band of said vibration detecting element.

The apparatus according to the present invention is an apparatus provided with an ultrasonic motor and a vibration detecting element, characterized in that the resonance frequency band of said ultrasonic motor is set to other band than the half value width band of the resonance of said vibration detecting element.

The apparatus according to the present invention is an apparatus provided with an ultrasonic motor and a vibration detecting element, characterized in that the mode of the resonance of said vibration detecting element is a basic vibration mode or a mode higher by one order than the basic vibration mode.

The apparatus according to the present invention is the above-described apparatus provided with an ultrasonic motor and a vibration detecting element, characterized in that said apparatus is a camera system in which a photo-taking lens and a camera body are integral with each other or removably mountable.

The apparatus according to the present invention is the above-described apparatus provided with an ultrasonic motor and a vibration detecting element, characterized in that said ultrasonic motor is provided in said photo-taking lens, and said vibration detecting element is provided in said photo-taking lens or said camera body.

The apparatus according to the present invention is the above-described apparatus provided with an ultrasonic motor and a vibration detecting element, characterized in that said ultrasonic motor is a drive source for adjusting the focus of the photo-taking lens, and said vibration detecting element is a sensor for detecting camera shake.

In the present invention, the resonance frequency band and/or the drive control range of the ultrasonic motor and the primary or secondary resonance frequency band and/or the half value width band of the primary or secondary resonance of the vibration detecting element are set such that the half value width band of the secondary resonance is a discrete band and therefore, it does not happen that the vibration detecting element resonates due to the vibration of the ultrasonic motor, and accurate vibration detection becomes possible.

DESCRIPTION OF THE PREFERRED EMBODIMENTS

The present invention will hereinafter be described in greater detail with respect to some embodiments thereof with reference to the drawings.

Figure 2:
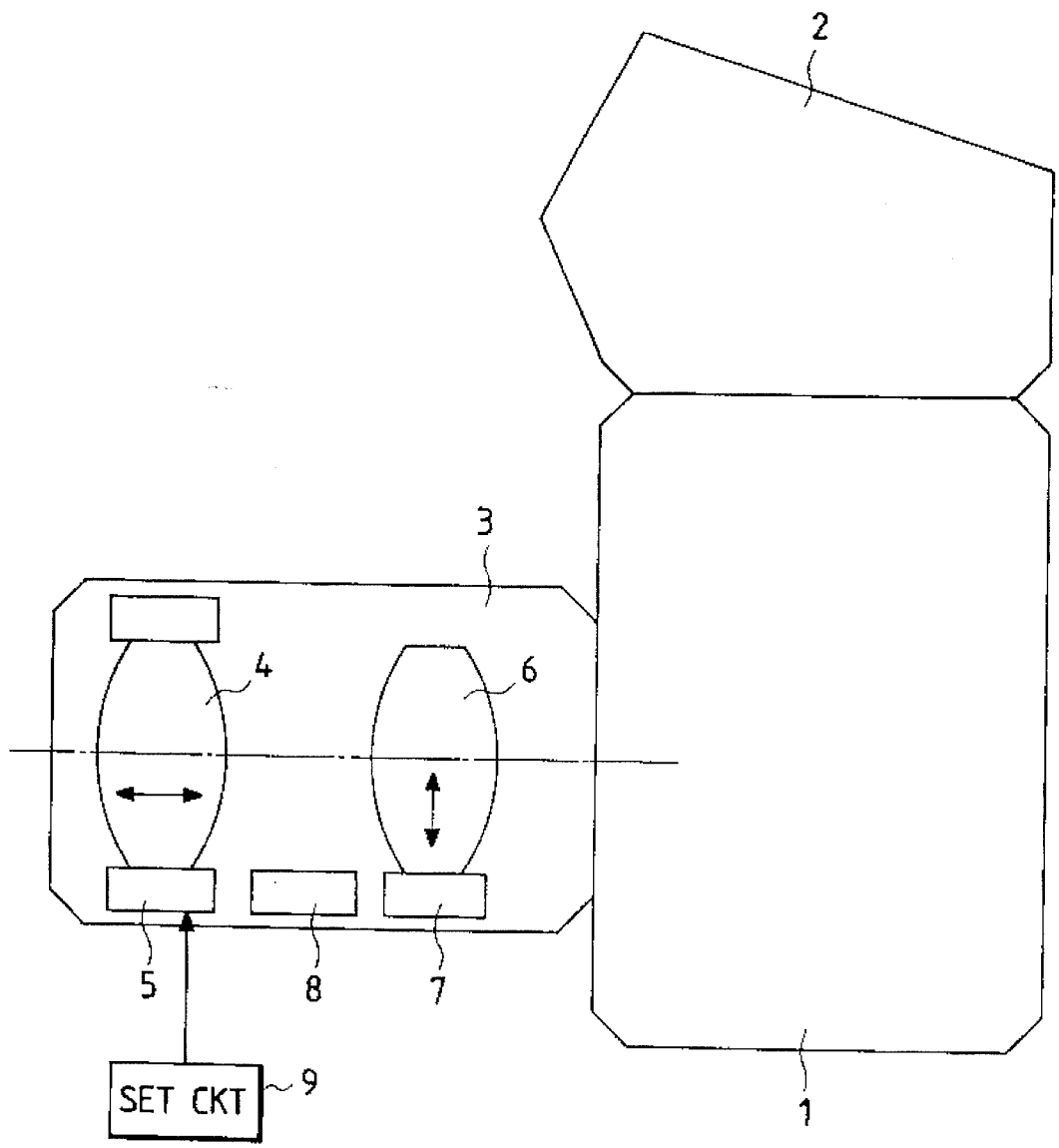
FIG. 2 shows the construction of an embodiment of the apparatus provided with an ultrasonic motor and a vibration detecting element according to the present invention.

FIG. 2 shows the construction of an embodiment of an apparatus provided with an ultrasonic motor and a vibration detecting element according to the present invention. A camera body 1 has a finder 2 and a photo-taking lens 3 mounted thereon, and these together constitute a camera system. The photo-taking lens 3 has a focus adjusting lens 4, an ultrasonic motor 5 for driving the focus adjusting lens 4, a correcting optical system 6 for correcting image vibration, an actuator 7 for driving the correcting optical system 6, a vibration detecting element 8 for detecting the vibration of the photo-taking lens 3, and a set circuit for setting the drive control range of the ultrasonic motor 5.

Figure 3:
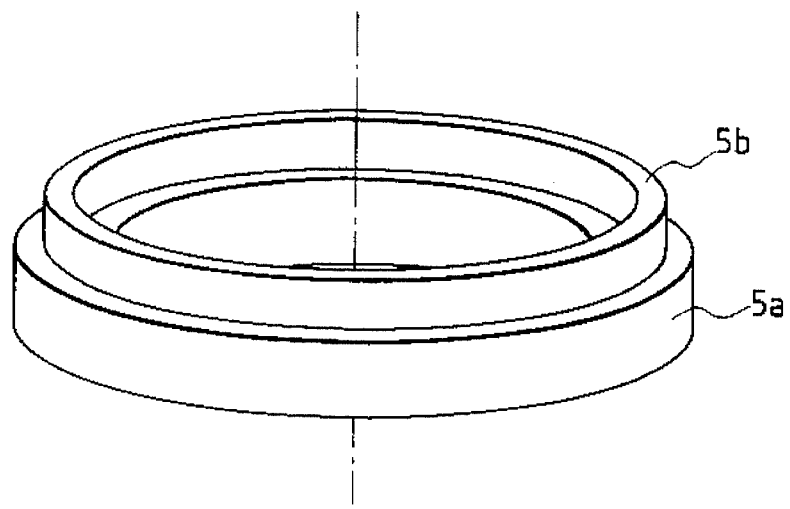
FIG. 3 is a perspective view showing an ultrasonic motor used in the apparatus of the embodiment in FIG. 2.

FIG. 3 is a perspective view showing the ultrasonic motor used in the apparatus of the present embodiment. The ultrasonic motor 5 is comprised of a stator 5a and a rotor 5b. The type of the ultrasonic motor to which the present invention is directed is not restricted to the circular ring type as shown in this embodiment.

Figure 4:
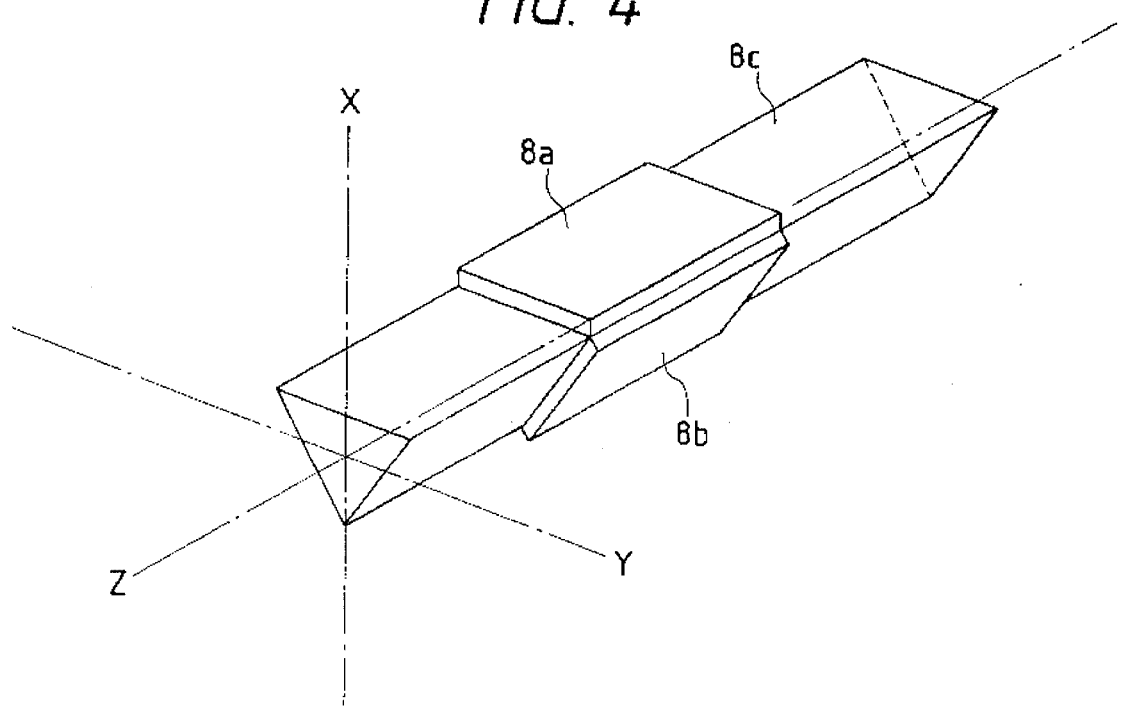
FIG. 4 is a perspective view showing a vibration detecting element used in the apparatus of the embodiment in FIG. 2.

FIG. 4 is a perspective view showing the vibration detecting element used in the apparatus of the present embodiment. The vibration detecting element 8 is what is called the piezoelectric vibration gyro type, and is such that an exciting piezoelectric element 8a excites a triangle pole 8c and the fluctuation of an object to be detected is detected by a detecting piezoelectric element 8b by the utilization of Corioli's force. The detailed structure of the vibration detecting element 8 are described in "Nikkei Electronics", Nov. 26, 1990, pp. 183–191, and therefore need not be described herein. The type of the vibration detecting element to which the present invention is directed is not restricted to the piezoelectric vibration gyro type as shown in this embodiment.

Figure 1:
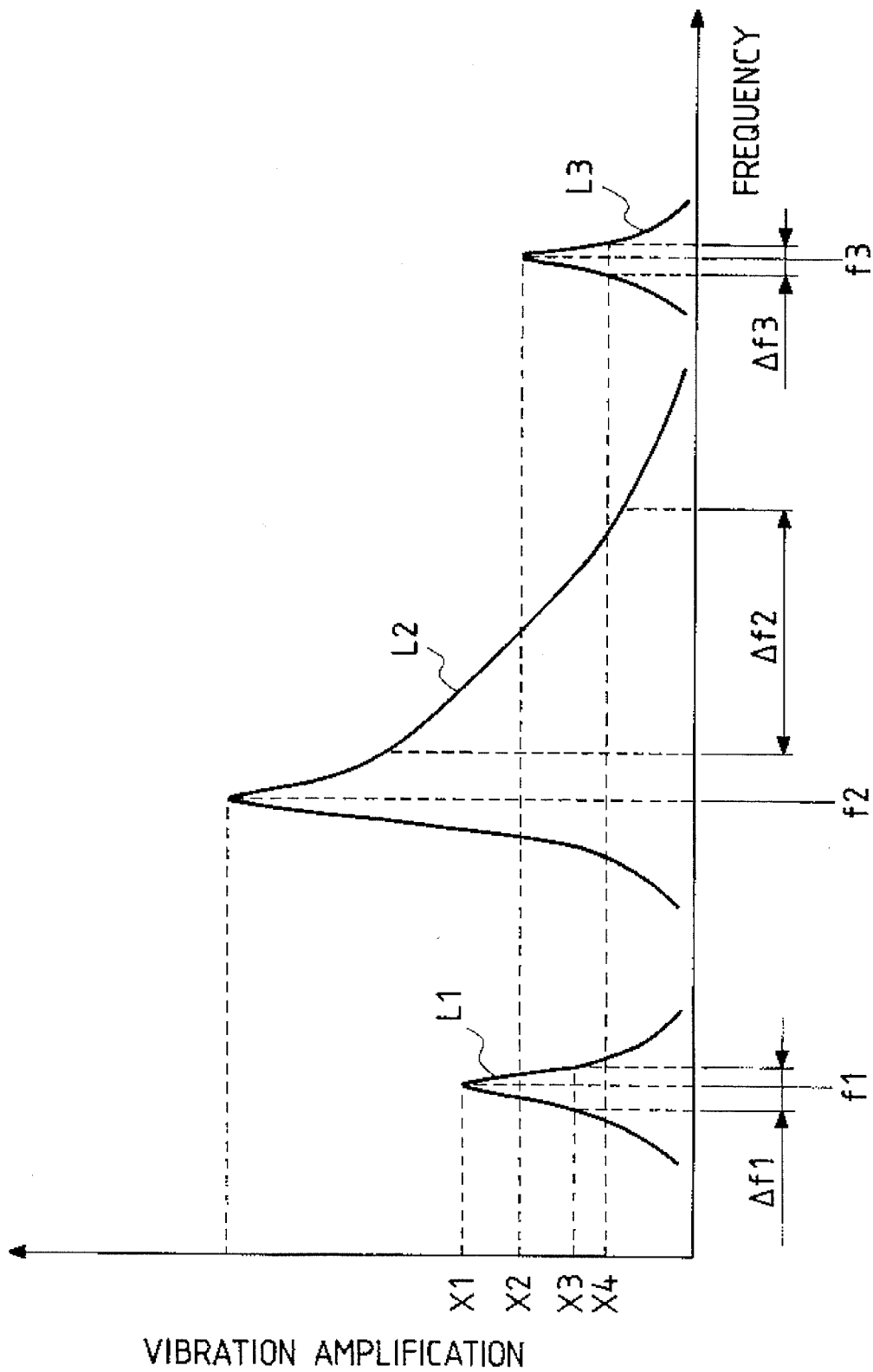
FIG. 1 is a graph showing the relations of the resonance characteristic of an embodiment of an apparatus provided with an ultrasonic motor and a vibration detecting element according to the present invention.

FIG. 1 is a graph showing the relations of the resonance characteristics of an embodiment of the apparatus provided with an ultrasonic motor and a vibration detecting element according to the present invention.

In FIG. 1, the axis of abscissas represents frequency and the axis of ordinates represents the absolute values of the vibration amplitudes of the ultrasonic motor 5 and vibration detecting element 8. Respective symbols in the graph of FIG. 1 mean as follows:

L1: the primary (basic vibration mode) resonance characteristic of the vibration detecting element 8

L2: the resonance characteristic of the ultrasonic motor 5

L3: the secondary resonance characteristic of the vibration detecting element 8 f1: the primary (basic vibration mode) resonance frequency of the vibration detecting element 8 f2: the secondary resonance frequency of the ultrasonic motor 5 f3: the secondary resonance frequency of the vibration detecting element 8

$\Delta f1$: the band of a half value width (X3/X1=½) in the primary (basic vibration mode) resonance of the vibration detecting element 8

$\Delta f2$: the frequency control range of the ultrasonic motor 5

$\Delta f3$: the band of a half value width (X4/X2=½) in the secondary resonance of the vibration detecting element 8

When incorporating the ultrasonic motor 5 and the vibration detecting element 8 into an apparatus, it is preferable to set them to the following conditions in order to prevent the vibration detecting element 8 from resonating due to the vibration of the ultrasonic motor 5.

(1) To separate the resonance frequency f2 of the ultrasonic motor 5 from the primary (basic vibration mode) resonance frequency f1 of the vibration detecting element 8;

(2) To separate the frequency control range $\Delta f2$ of the ultrasonic motor 5 from the primary (basic vibration mode) resonance frequency f1 of the vibration detecting element 8;

(3) To separate the frequency control range $\Delta f2$ of the ultrasonic motor 5 from the half value width band $\Delta f1$ of the primary (basic vibration mode) resonance of the vibration detecting element 8;

(4) To separate the resonance frequency f2 of the ultrasonic motor 5 from the secondary resonance frequency f3 of the vibration detecting element 8;

(5) To separate the frequency control range $\Delta f2$ of the ultrasonic motor 5 from the secondary resonance frequency f3 of the vibration detecting element 8; and (6) To separate the frequency control range $\Delta f2$ of the ultrasonic motor 5 from the half value width band $\Delta f3$ of the secondary resonance of the vibration detecting element 8.

Such setting is done by adjusting the set circuit 9 in FIG. 2. When the photo-taking lens 3 is of the interchangeable type and the vibration detecting element 8 is provided on the camera body 1 side, the adjustment by the set circuit 9 may be automatically or manually made each time a different photo-taking lens 3 is mounted on the camera body 1. Also, the setting may be fixed setting selected at the stage of design.

Also, the above embodiment has been described with respect to an example in which the resonance frequency f2 and frequency control range $\Delta f2$ of the ultrasonic motor 5 are set to bands discrete from the primary or secondary resonance frequency f1 and the half value width band $\Delta f1$ of the primary or secondary resonance of the vibration detecting element 8, but alternatively, the resonance frequency f2 of the ultrasonic motor 5 may be set to a band discrete from the half value width band $\Delta f1$ of the primary or secondary resonance of the vibration detecting element 8, or the frequency control range $\Delta f2$ of the ultrasonic motor 5 may be set to a band discrete from the primary or secondary resonance frequency f1 of the vibration detecting element 8. Also, some adjustment may be made on the vibration detecting element 8 side with the ultrasonic motor 5 as the reference.

As described above, according to the present invention, design is made such that the resonance frequency band and/or frequency control range of the ultrasonic motor does not coincide with the primary or secondary resonance frequency band and/or the half value width band of the resonance of the vibration detecting element, and this leads to the effect that it never happens that the vibration detecting element resonates due to the vibration of the ultrasonic motor, and accurate vibration detection becomes possible.

Also, in the case of an apparatus in which the ultrasonic motor drives the focus adjusting lens and the vibration detecting element detects the vibration of the photo-taking lens, accurate vibration prevention becomes possible.

Figure 5:
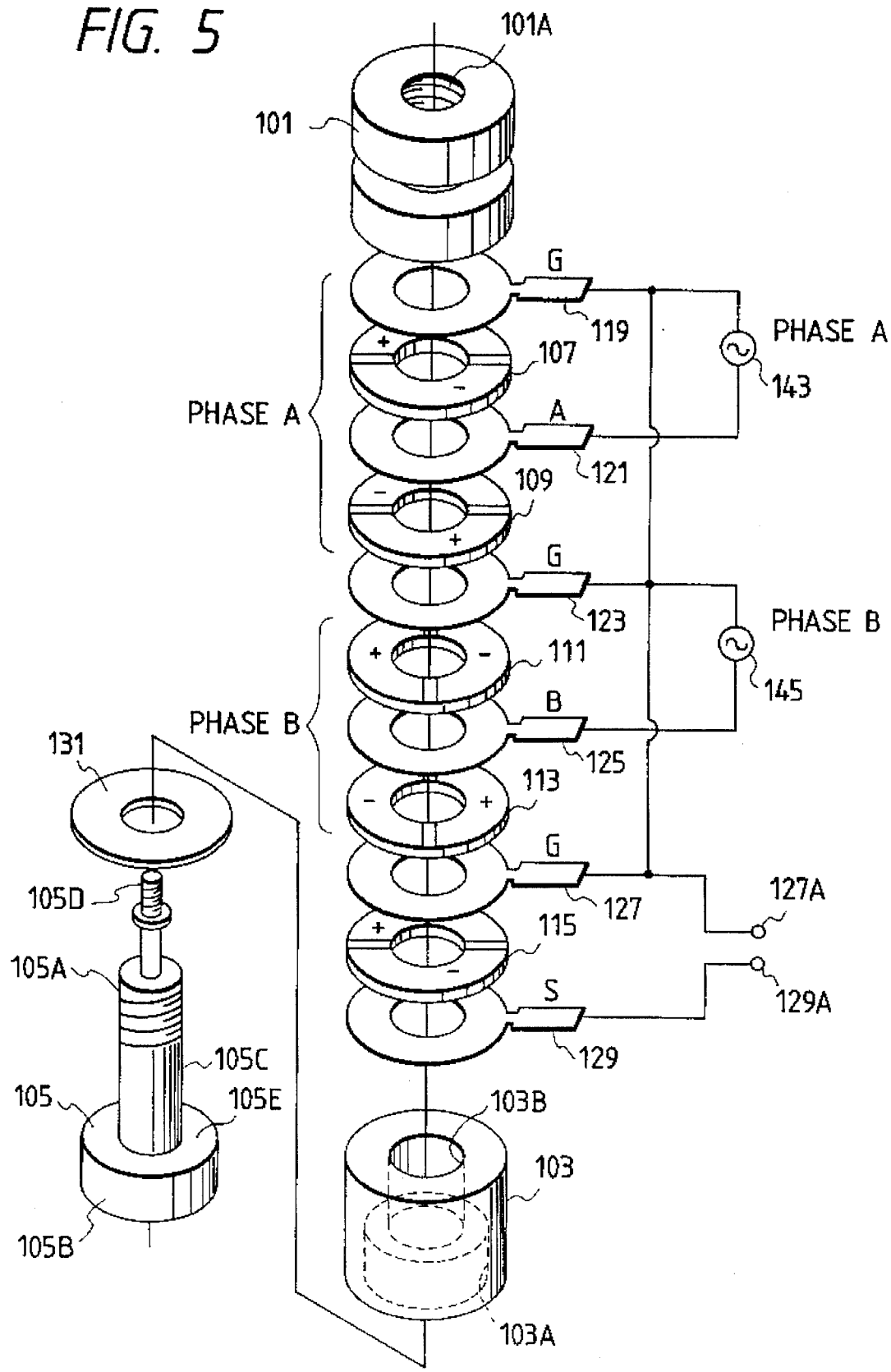
FIG. 5 is a fragmentary exploded perspective view of a vibration type motor of another embodiment.

FIG. 5 is an exploded perspective view of an embodiment of a vibration type motor.

In FIG. 5, a piezoelectric element as a mechanical-electrical energy conversion element comprised of PZT or the like is eliminated. In its place, an insulating washer 131 is inserted between an electrically conductive bolt 105 and a block 103 as an insulating member for electrically insulating an upper metal block 101 and the lower metal block 103 from each other.

In FIG. 5, the reference numeral 101 designates an electrically conductive upper metal block constricted in the middle thereof and having at the center thereof a threaded hole 101A threadably engaged with the threaded portion 105A of the electrically conductive bolt 105. A sliding portion 101B pressure-engaged with a sliding portion of a rotor is provided on the upper surface of the upper metal block 101.

The reference numeral 103 denotes an electrically conductive lower metal block having two holes 103A and 103B of different diameters. The diameters of these holes 103A and 103B are larger than the diameters of the base portion 105B and intermediate portion 105C, respectively, of the bolt 105 so that the block 103 and the bolt 105 may not contact with each other.

The bolt 105 has the aforementioned portions 105A, 105B and 105C and is of such a shape as shown in FIG. 5 which has in the end portion thereof a threaded portion 105D threadably engaged with a nut (not shown).

The reference numerals 107 to 113 designate hollow circular piezoelectric elements as an electro-mechanical energy conversion element comprised, for example, of PZT. The piezoelectric elements 107 and 109 constitute phase A elements and the piezoelectric elements 111 and 113 constitute phase B elements. In the present embodiment, phase A and phase B each are constituted by two piezoelectric elements, but alternatively each phase may be constituted by a single piezoelectric element.

The diameter of the hollow portion of each piezoelectric element 107 to 113 is larger than the outer diameter of the intermediate portion 105C of the bolt 105. Each element is polarized on the opposite sides of the center line, as shown in FIG. 5, with a direction of polarization in the direction of thickness.

The reference numeral 115 denotes a sensor formed by a piezoelectric element as a mechanical-electrical energy conversion element for detecting the vibration state of the metal blocks 101 and 103 constituting an ultrasonic vibrator. The diameter of the hollow portion of the sensor 115 is also larger than the outer diameter of the intermediate portion 105C of the bolt 105 so that the sensor 115 may not contact with the bolt 105.

The reference numerals 119, 121 and 123 designate electrodes for supplying an AC voltage of e.g. about 20 KHz from a power source 143 to the piezoelectric elements 107 and 109. The reference numerals 123, 125 and 127 denote electrodes for supplying an AC voltage of e.g. about 20 KHz having a phase difference with respect to the AC voltage output from the power source 143 from a power source 145 to the piezoelectric elements 111 and 113. An earth electrode 123 is electrically connected to an earth electrode 127 through the intermediate portion 105C of the bolt 105.

The reference numerals 127 and 129 designate electrodes which output to output terminals 127A and 129A, respectively, an electrical signal from the sensor 115 corresponding to the vibration of the metal blocks 101 and 103 as vibration members.

Output terminals 127A and 129A transmit the output signal from the sensor 115 to a vibrator control circuit, not shown.

The reference numeral 131 denotes an insulating washer as an insulating member provided between the upper surface 105E of the electrically conductive bolt 105 and the lower surface of the lower metal block 103 to prevent the lower metal block 103 and the upper metal block 101 from being short-circuited, i.e., assuming the same potential, through the bolt 105. The insulating washer 131 has an aperture having a diameter larger than the diameter of the intermediate portion 105C of the bolt 105.

The operation of the vibration type motor of the above-described construction will now be described.

When AC voltages are supplied from the power sources 143 and 145 to the piezoelectric elements 107 to 113 for phase A and phase B through the electrodes 119 to 127, vibrations are excited in the two phases of the vibrators 101 and 103 by vibrations generated in the piezoelectric elements 107 to 113, and since these vibrations have a predetermined phase difference in time therebetween due to there being a phase difference between the respective AC voltages, rotational motion is created on the surfaces of the vibrators 101 and 103. Therefore, a rotor (not shown) which is in pressure engagement with the metal block 101 constituting the vibrator makes rotational motion.

The output signal of the sensor 115 will now be described.

The metal block 101, which is in contact with earth electrode 119, assumes the earth potential. The lower metal block 103 does not assume the earth potential, which is the same potential as that of the electrode 119, due to the insulating washer 131. Therefore, the electrode 129, which is in contact with the lower metal block 103, is not at the earth potential.

Accordingly, an electrical signal output from the sensor 115 which corresponds to the vibration state of the vibrator 101, 103 is outputted from output terminals 127A and 129A through electrodes 127 and 129.

As described above, according to the present embodiment, the potentials of the upper and lower metal blocks are made different from each other by the insulating washer 131. Therefore, even if only one sensor 115 is used, the vibration state of the vibrator of the vibration type motor can be detected.

The ultrasonic motor itself shown in FIG. 5 is known, for example, from U.S. Pat. No. 5,231,325, etc.

Figure 6:
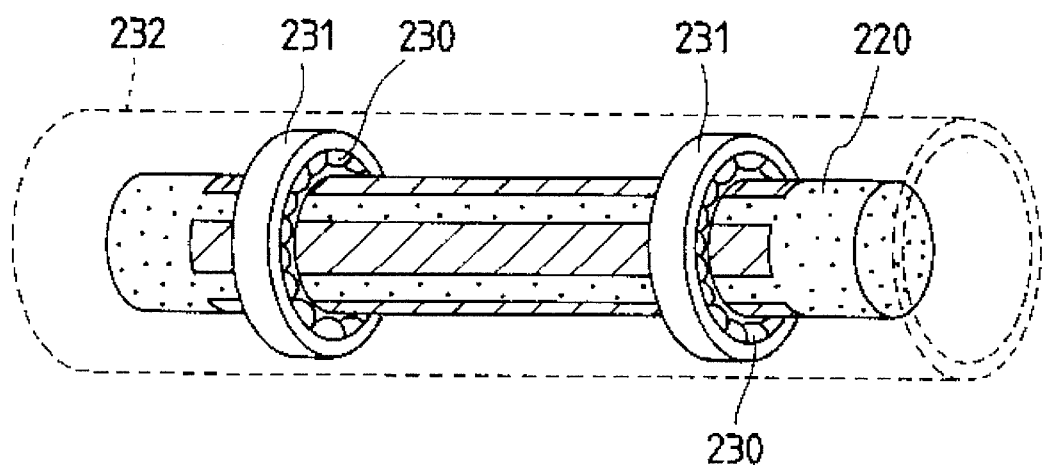
FIG. 6 is a perspective view showing the structure of a piezoelectric ceramic cylinder used in a piezoelectric vibration gyro which is another embodiment of the vibration detecting element.

FIG. 6 is a perspective view showing the structure of a piezoelectric ceramic cylinder used in a piezoelectric vibration gyro which is another embodiment of the vibration detecting element.

In order to provide a piezoelectric gyro in which influence given to bending vibrations in right-angled directions is reduced and moreover the manner in which the influence is given is symmetrical with respect to each direction of vibration and influence given to the characteristic of the piezoelectric vibration gyro is little, in a piezoelectric vibration gyro wherein a belt-like electrode 221 parallel to the lengthwise direction is formed on the outer peripheral surface of cylindrical piezoelectric ceramics 220 and a polarizing process is effected by the use of this belt-like electrode 221 and driving and detection are effected by the utilization of the bending vibration mode by the piezoelectric effect of the cylindrical piezoelectric ceramics, the cylindrical piezoelectric ceramics 220 are supported and fixed at the nodal point of the bending vibration thereof through a belt-like ring 230 formed of fiber such as cloth or unwoven fabric or a foamed material such as foamed styrol or sponge.

The construction itself shown in FIG. 6 is also known, for example, from Japanese Utility Model Application Laid-Open No. 5-2016, etc.

What is claimed is:

1. A driving apparatus mounted on an instrument which may be vibrated by receiving an extraneous force, said driving apparatus having an ultrasonic motor which provides a drive source, said instrument being provided with a vibration detecting element for detecting the vibration of said instrument, wherein the resonance frequency band of said vibration detecting element and the resonance frequency band of said ultrasonic motor are set to discrete bands.

2. A driving apparatus mounted on an instrument which may be vibrated by receiving an extraneous force, said driving apparatus having an ultrasonic motor which provides a drive source, said instrument being provided with a vibration detecting element for detecting the vibration of said instrument, wherein the half value width band of the resonance of said vibration detecting element and the frequency control range of said ultrasonic motor are set to discrete bands.

3. A driving apparatus mounted on an instrument which may be vibrated by receiving an extraneous force, said driving apparatus having an ultrasonic motor which provides a drive source, said instrument being provided with a vibration detecting element for detecting the vibration of said instrument, wherein the resonance frequency band of said vibration detecting element and the frequency control range of said ultrasonic motor are set to discrete bands.

4. A driving apparatus mounted on an instrument which may be vibrated by receiving an extraneous force, said driving apparatus having an ultrasonic motor which provides a drive source, said instrument being provided with a vibration detecting element for detecting the vibration of said instrument, wherein the half value width band of the resonance of said vibration detecting element and the resonance frequency band of said ultrasonic motor are set to discrete bands.

5. A driving apparatus mounted on an instrument which may be vibrated by receiving an extraneous force, said driving apparatus having an ultrasonic motor which provides a drive source, said instrument being provided with a vibration detecting element for detecting the vibration of said instrument, wherein the resonance frequency band of said ultrasonic motor is set to other band than the resonance frequency band of said vibration detecting element.

6. A driving apparatus mounted on an instrument which may be vibrated by receiving an extraneous force, said driving apparatus having an ultrasonic motor which provides a drive source, said instrument being provided with a vibration detecting element for detecting the vibration of said instrument, wherein the frequency control range of said ultrasonic motor is set to other band than the half value width band of the resonance of said vibration detecting element.

7. A driving apparatus mounted on an instrument which may be vibrated by receiving an extraneous force, said driving apparatus having an ultrasonic motor which provides a drive source, said instrument being provided with a vibration detecting element for detecting the vibration of said instrument, wherein the frequency control range of said ultrasonic motor is set to other band than the resonance frequency band of said vibration detecting element.

8. A driving apparatus mounted on an instrument which may be vibrated by receiving an extraneous force, said driving apparatus having an ultrasonic motor which provides a drive source, said instrument being provided with a vibration detecting element for detecting the vibration of said instrument, wherein the resonance frequency band of said ultrasonic motor is set to other band than the half value width band of the resonance of said vibration detecting element.

9. The driving apparatus of claim 1, wherein the mode of the resonance of said vibration detecting element is a basic vibration mode or a mode higher by one order than the basic vibration mode.

10. The driving apparatus of claim 1, which is mounted on a camera system comprising a photo-taking lens and a camera body.

11. The driving apparatus of claim 10, wherein said ultrasonic motor drives the photo-taking lens, and said vibration detecting element detects the vibration of said photo-taking lens.

12. The driving apparatus of claim 11, wherein said ultrasonic motor is a drive source for adjusting the focus of the photo-taking lens, and said vibration detecting element is a sensor for detecting camera shake.

13. An apparatus adapted to drive a moving member by an ultrasonic motor, wherein a vibration detecting element for detecting the vibration of said apparatus is provided, and the resonance frequency band of said vibration detecting element and the resonance frequency band of said ultrasonic motor are set to discrete bands.

14. The apparatus of claim 13, which is a camera system comprising a photo-taking lens and a camera body.

15. A camera system comprising:

a camera body;

a photo-taking optical system driven for focusing by an ultrasonic motor;

a vibration correcting optical system inserted in a photo-taking optical path and movable so as to prevent image vibration even if said camera body is vibrated;

an actuator for driving said vibration correcting optical system;

a vibration detecting element for detecting the vibration of said camera system; and a control circuit for controlling said actuator on the basis of the vibration detected by said vibration detecting element;

wherein the resonance frequency band of said vibration detecting element and the resonance frequency band of said ultrasonic motor are set to discrete bands.

* * * * *